United States Patent [19]

Panster et al.

[11] Patent Number: 4,552,700
[45] Date of Patent: Nov. 12, 1985

[54] ORGANOPOLYSILOXANES CONTAINING SULPHONATE GROUPS, METHOD FOR THE PRODUCTION AND USE THEREOF

[75] Inventors: Peter Panster, Rodenbach; Horst Grethe; Peter Kleinschmit, both of Hanau, all of Fed. Rep. of Germany

[73] Assignee: Degussa Aktiengesellschaft, Frankfurt, Fed. Rep. of Germany

[21] Appl. No.: 507,200

[22] Filed: Jun. 23, 1983

[30] Foreign Application Priority Data

Jul. 13, 1982 [DE] Fed. Rep. of Germany ....... 3226093

[51] Int. Cl.$^4$ ............................ C07F 7/08; C07F 5/06; C07F 7/28
[52] U.S. Cl. ........................ 556/9; 556/428; 556/10; 556/173
[58] Field of Search ................ 556/428; 260/429.5, 260/448 R, 448 A

[56] References Cited
U.S. PATENT DOCUMENTS

| | | | |
|---|---|---|---|
| 3,109,012 | 10/1963 | Rossmy et al. | 556/428 |
| 3,183,254 | 5/1965 | Rossmy et al. | 556/428 |
| 3,882,055 | 5/1975 | Koerner et al. | 556/428 X |
| 4,087,448 | 5/1978 | Rossmy et al. | 556/428 |
| 4,152,165 | 5/1979 | Langager | 556/428 X |

*Primary Examiner*—Paul F. Shaver
*Attorney, Agent, or Firm*—Beveridge, DeGrandi & Weilacher

[57] ABSTRACT

Organopolysiloxanes are described with the same or different units of the formula:

$$(O_{3/2}Si-R^1-SO_3^-)_xM^{x+} \tag{1}$$

in which $R^1$ is alkyl, x is dependent on M and signifies a number from 1 to 4 and M represents hydrogen or a mono- to tetravalent metal ion and the valences of the oxygen atoms are saturated by silicon atoms of other groups of the formula (1), optionally by inserting cross-linking silicon, titanium or aluminum compounds and/or by di-, tri- and tetrasulfide units of the formula:

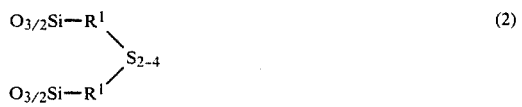

(2)

in which the substituents $R^1$ have the same meaning as in (1) and can be the same or different, wherein the ratio of the sum of silicon atoms in (1) and (2) to the silicon, titanium and aluminum atoms of the cross-linking agent ranges from 1:0 to 1:10. Furthermore, the method of obtaining the organopolysiloxanes containing sulphonate groups and the use thereof as strongly acidic cation exchangers are described.

45 Claims, No Drawings

ORGANOPOLYSILOXANES CONTAINING SULPHONATE GROUPS, METHOD FOR THE PRODUCTION AND USE THEREOF

The invention relates to new organopolysiloxanes containing sulphonate groups which are strongly acidic cation exchangers and possess in their characteristics a number of advantages over known cation exchangers based on organic polymer systems as well as advantages over heretofore described systems based on inorganic supporting materials. In addition, processes for the production of these new products and the use thereof are described.

As is known, strongly acidic cation exchangers the functional groups of which consist of sulphonic acid groups are used widely in chemical applications and syntheses as solid acid catalysts or as carriers of active substances; e.g. for the purification and softening of water and aqueous solutions, for the treatment of drinking water, and for the recovery of metals from solutions. In principle, the types almost exclusively employed in the past always consisted of an organic, partly cross-linked polystyrene backbone to which sulphonate groups are bound by way of the phenyl rings.

In accordance with the known structure, the physical and chemical properties of these cation exchangers are characterized by the organic nature of the polymeric backbone, so that a number of disadvantages effect the technical field of application and are dependent thereon such as, for example, a relatively low temperature resistance of approximately 100° to 150° C., to a certain degree a great sensitivity to chemical attacks and bacterial invasion which can terminate in a complete breakdown of the matrix, solubility in certain solvents under more drastic conditions, strong swelling capacity and dependence of the exchanger volume on the type of cation, necessity of swelling so as to make the functional groups accessible and, therefore, non-usability in certain organic solvents. Furthermore, organic polymers of this type suffer a serious drawback in that, in view of the increasingly diminishing petroleum and coal supplies, there is no absolute guarantee that suitable raw materials will continue to be available on a long-term basis, so that in general conversion of these systems to an inorganic matrix composed of raw materials that are available in nearly unlimited quantities would be desirable.

Inorganic polymeric systems such as, for example, pyrogenic or precipitated silica, aluminum oxide, titanium dioxide, etc. also have other advantages, such as a fixed rigid structure, incapability of swelling or only a limited swelling capacity, high temperature and ageing resistance, insolubility in organic solvents, water and strong acids, as well as easy accessibility of the functional groups that may be present, since these usually are present on the surface. Under these conditions, it is easy to understand that strongly acidic ion exchangers based on inorganic materials have already been synthesized, such as evidenced by European Patent Application No. 0 008 902 or British Pat. No. 1 506 226.

However, one drawback in these cases is the fact that the loadability of inorganic substances is only very small due to the relatively small number of functional groups, because corresponding strongly acidic cation exchangers have in the H+ form a maximum capacity of only 0.5–0.6 meq/g. Since the anchoring of the SO₃H-carrying group on the carrier surface, for steric reasons, occurs in the statistical mean only via an Si—O—Si unit, there is always the additional danger that it might be set free.

The state of the art in the field of ion exchangers is described with clarity in, for example, Ullmanns Enzyklopädie der technischen Chemie, 4th Edition, Vol. 13, page 279 or in Chem.-Ing.-Techn. 51, 7, 728 (1979).

Now, the present invention has found new strongly acidic cation exchangers with an organopolysiloxane backbone that also have the advantages of the above described inorganic types, but not their disadvantages because their capacity is higher by one multiple and the anchoring of the organic groups carrying SO₃ occurs via an Si-atom which is built trivalently into the matrix and is therefore more fixed. In addition, the stability of the matrix can be increased by the insertion of so-called cross-linking agents in the form of di-, tri- and tetravalently bonded silicon, titanium and aluminum units which carry on sulphonic acid groups and the SO₃ group density as well as the specific surface and porosity can be influenced by this step.

According to the invention, these new ion exchanger materials can be obtained through oxidation of di-, tri- and tetrasulfide compounds having a basic organopolysiloxane backbone.

More specifically, these organopolysiloxanes according to the invention are characterized by the fact that they contain identical or different units of the general formula:

$$(O_{3/2}Si—R^1—SO_3^-)_xM^{x+} \qquad (1)$$

in which $R^1$ represents a linear or a branched alkyl group with 1 to 12 C-atoms, a cycloalkyl group with 5 to 8 C-atoms, or a unit of the formula:

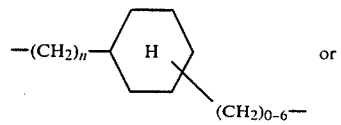

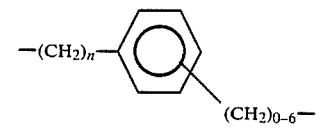

in which n is an integer from 1 to 6 and denotes the number of methylene groups attached to sulphur, x is dependent on the valence of M and is a number from 1 to 4, M is hydrogen or a mono-to tetravalent metal ion, the free valences of the oxygen atoms being saturated by silicon atoms of other groups of the formula (1) and/or by cross-linking bridge members of the formula:

| | | |
|---|---|---|
| SiO₄/₂, | R'SiO₃/₂, | R'₂SiO₂/₂, |
| TiO₄/₂, | R'TiO₃/₂, | R'₂TiO₂/₂, |
| AlO₃/₂, | R'AlO₂/₂ | | wherein R' is a methyl or ethyl group, and/or are saturated by di-, tri- and tetrasulfide units of the general formula

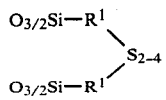 (2)

in which the bridge members $R^1$ have the same meaning as in formula (1) and can be identical or different, and the ratio of the sum of the Si-atoms in formulas (1) and (2) to the bridge atoms silicon, titanium and aluminum can be 1:0 to 1:10.

The ratio of the units carrying sulphonate groups according to formula (1) to the groups of cross-linking agents containing Si, Ti or Al that may be present in the polymeric back bone and to the di-, tri- and tetrasulfide units according to formula (2) is limited downwardly in that if the $H^+$ type is present, that is to say, if $x=1$ and $M=H$, there is at least one capacity of 0.1 meq $H^+$/g organopolysiloxane and one maximum capacity as a function of the group $R^1$, when practically no units as defined in formula (2) and no cross-linking bridge members containing Si, Ti or Al are present in the solid. In practice, however, this is not the case because with regard to the physical properties such as, for example, the specific surface, the temperature resistance, as well as the resistance of the matrix to partial solution and dissolution in aqueous media and with respect to the rapid access to all available $SO_3$ groups, it is desirable that groups of cross-linking agents containing Si, Ti or Al and/or di, tri and tetrasulfide units according to formula (2) are present in the polymeric bond. Thus, more suitable from the standpoint of properties for the technical application of the materials are organopolysiloxanes according to the invention that have a capacity of at least 0.1 meq $H^+$/g organopolysiloxane up to a maximum of 5 meq $H^+$/g organopolysiloxane, and particularly preferred are representative materials with a capacity of at least 0.5 meq $H^+$/g and a maximum of 3.5 meq $H^+$/g organopolysiloxane.

From the standpoint of accessibility to the corresponding precursors representatives of these new cation exchangers are again preferred in which the groups $R^1$ in formulas (1) and (2) are identical to each other, that is to say, that only one kind of group carrying $SO_3^-$ is present in the polymeric solid and, among these, particularly those in which $R^1$ is a propylene group, because in terms of raw materials these can very easily be obtained, since the synthesis of the precursors can occur on the basis or alkyl chlorides and trichlorosilane, e.g., according to the equations:

$$CH_2=CH-CH_2Cl + HSiCl_3 \xrightarrow{Pt/C} \quad I$$

$$Cl_3Si-CH_2-CH_2-CH_2Cl$$

$$Cl_3Si-CH_2CH_2CH_2Cl + 3C_2H_5OH \quad II$$
$$(H_5C_2O)_3Si-CH_2CH_2CH_2Cl + 3HCl$$

$$2(H_5C_2O)_3Si-CH_2CH_2CH_2Cl + Na_2S_{2-4} \quad III$$
$$[(H_5C_2O)_3Si-(CH_2)_3]_2S_{2-4} + 2NaCl$$

-continued $$[m(H_5C_2O)_3Si-(CH_2)_3]_2S_{2-4} + m.3H_2O \quad IV$$
$$\{[O_{3/2}Si-(CH_2)_3]_2S_{2-4}\}_m + m.6C_2H_5OH$$

By oxidizing the resulting polymeric di-, tri- or tetrasulfides with suitable oxidizing agents the desired organopolysiloxane containing $SO_3^-$ groups is finally obtained, during which process products can be readily obtained directly wherein the compensating ion is $H^+$, that is to say, $M^{x+}$ is $H^+$.

The monomeric precursors of the polymeric di, tri- and tetrasulfides are basically known compounds that can be synthesized according to current procedures such as, for example those described in Accepted West German Specification Nos. 21 41 159, 21 41 160, 27 12 866, 24 05 758, in West German Pat. No. 25 42 534 or those described by M. Schmidt and M. Weiber in Inorg. Chem. 1, 909 (1962), the disclosures of which are relied on and incorporated herein by reference.

Particularly preferred for reasons of economy and partly also for ecological reasons are generally also the cation exchanger substances obtained through oxidation of the disulfide defined in formula (2), wherein the two groups $R^1$ each have the same meaning, because the minimum quantity of oxidizing agent is required for their production and at the same time for no $SO_3$ or $H_2SO_4$ is obtained or only small quantities thereof, which is always the case if tri- or tetrasulfide is used as a result of the simultaneous oxidation of the middle sulphur atom or atoms. Since, from the reasons set forth above, no full oxidation of all the di-, tri- and tetrasulfide groups present in the solid is desirable and, hence, a certain portion thereof also remains in the end product, it is better, in terms of the application of these new cation exchangers, that instead of the tri- or tetrasulfide unit, which gives off sulphur with relative ease, the relatively inert disulfide group be present. However, use of the tri- or tetrasulfide can result in advantages with respect to the control of the oxidation process by monitoring the increase of the acid accumulation.

With respect to the stability of the cation exchanger material vis-a-vis partial solution or dissolution at an elevated temperature in water or polar organic solvents, it is advisable to subject the product containing $SO_3^-$ groups obtained after oxidation, immediately after its production simultaneously with the drying or shortly before its use, to a tempering in the form of a 1-hour to 4-day treatment at a temperature of at least 150° C. up to a maximum of 450° C., if necessary in vacuo. This is because during the tempering there occurs a further dehydration or a removal of alkoxy groups that are present in the polymeric substance in the form of the coresponding alcohol accompanied by the simultaneous formation of siloxane compounds which, analogous to the outcome of well-known tempering steps in the case of simple silicic acids or silica gels, results in an increase of the resistance to hydrolysis or solvolysis.

An object of the invention are also methods of manufacturing the new cation exchanger substances. According to the first method, polymeric di, tri- or tetrasulfides consisting of units of the formula:

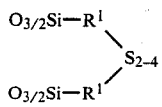

wherein both $R^1$ groups have the same or a different meaning and represent a linear or branched alkyl group with 1 to 12 C-atoms, a cycloalkyl group with 5–8 atoms or a unit of the formula:

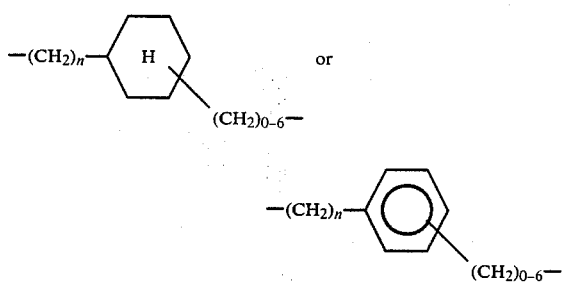

wherein n is an integer from 1 to 6 and denotes the number of the methylene groups attached to sulphur, and the free valences of the oxygen atoms are saturated by silicon atoms of other groups of the formula (2) and/or by cross-linking bridge members

| $SiO_{4/2}$, | $R'SiO_{3/2}$, | $R'_2SiO_{2/2}$, |
|---|---|---|
| $TiO_{4/2}$, | $R'TiO_{3/2}$, | $R'_2TiO_{2/2}$, |
| $AlO_{3/2}$, | $R'AlO_{2/2}$ | | wherein R' is a methyl- or ethyl group,
suspended in water and/or in an alcohol with from 1 to 5 C-atoms,
are converted with stochiometric, insufficient or excessive quantities, in the latter case up to 20 times the quantity required for full oxidation of an oxidizing agent which is at least partially dissolved and whose oxidation potential is at least sufficient to convert C-bonded sulphur of the formal stage of oxidation −1 into C-bonded sulphur of the formal stage of oxidation +4.

at temperatures ranging from −78° to 250° C., preferably −30° to 150° C., and more particularly 0° to 100° C. and at a pH value of maximum 11, during a few minutes to several days, optionally under a pressure which corresponds to the sum of the partial pressures of the reactants at the reaction temperature, whereupon the solid is separated or extracted from the liquid phase or washed, then dried, optionally in vacuo, at temperatures ranging from room temperature to 200° C. and is tempered from 1 hour to 4 days, optionally in vacuo, at temperatures ranging from 150° to 450° C., during which process extraction or washings and drying as well as the tempering may be repeated, and that the product is finally ground and/or classified, as desired, as well as retempered, whereby one or more of the steps provided after the conversion can be eliminated or carried out in another sequence.

Thus, for example, the cation exchanger material can first be dried and then ground and/or classified in accordance with current techniques. If it is desired to produce a product as finely ground product as possible, the grinding can also be effected in suspension during or immediately after oxidation, or also, when in the wet condition immediately after separation from the liquid phase.

With regard to the rate of oxidation of the polymeric sulfide, a distinct dependency on the fineness of the particle size is apparent, as expected, so that an accelerated oxidation can be determined with a smaller particle size. Oxidizing agents with which, in all of the manufacturing processes disclosed in this application, an oxidative decomposition of the di-, tri- and tetrasulfide unit can be achieved are, for example, hydrogen peroxide, sodium peroxide, sodium persulphate, sodium chlorite or sodium hypochlorite, bromine or bromine water, or the various types of inorganic peracids such as, for example, persulphuric acid or perphosphoric acid and organic peracids such as, for example, peracetic acid, perproprionic acid or perbenzoic acid or mixtures of $H_2O_2$ with inorganic or organic acids or peracids. Among these oxidizing agents, hydrogen peroxide is understandably particularly preferred for reasons of economy and ecology, because on the one hand it is a relatively inexpensive oxidizing agent and, on the other, its use converts it into the safe end product water only.

As an example, starting out from a typical non-cross-linked polydisulfideorganosiloxane the reaction occurring in the oxidation process of a polymeric unit can be described by the following equation:

$$[O_{3/2}Si-CH_2CH_2CH_2]_2S_2 + 5H_2O_2$$
$$2O_{3/2}Si-CH_2CH_2CH_2-SO_3H + 4H_2O$$

The same holds true for organic peracids which, when used, are converted into the corresponding organic acids which can then easily be recycled or for a combination of hydrogen peroxide with organic acids or peracids.

To avoid a complete through-oxidation of all the sulphur atoms present which, as mentioned earlier, particularly with respect to the stability of the product vis-a-vis partial solution or dissolution in water and protic solvents, would be a disadvantage, monitoring the oxidation process through the pH of the oxidation suspension has proved a success, because this pH value decreases with a diminishing degree of oxidation. After achieving the optimum pH value determined empirically, the suspension is diluted and/or the solid is separated immediately from the liquid phase and washed and processed further in the manner previously described immediately after the processes mentioned above.

In a simplified modification of the method described above, the oxidation occurs not in a suspension of the polymeric di-, tri- or tetrasulfide, but simply by direct wetting of these solids with a solution, in water or in an alcohol containing 1 to 5 C-atoms, of stochiometric, insufficient or excessive quantities, in the latter case up to 20 times the quantity required for full oxidation of an oxidizing agent whose oxidation potential is at least sufficient to convert C-bonded sulphur of the formal stage of oxidation −1 into C-bonded sulphur of the formal stage of oxidation +4.

The wetted solid is then converted with the oxidizing agent at temperatures from −78° to 250° C., preferably −30° to 150° C., more particularly 0° to 100° C. for a few minutes to several days, optionally, in vacuo.

Thereupon, it is dried, again optionally in vacuo, at temperatures ranging from room temperature to 200° C. Then follows continuous tempering, optionally in vacuo, at temperatures from 150° to 450° C. for 1 hour to 4 days. The product can then be ground and/or classified and, optionally, extracted or washed once or more times with water or with an alcohol containing from 1 to 5 C-atoms, and dried and/or retempered. In this case, one or more of the steps enumerated after the conversion can be omitted or carried out in another sequence.

By contrast, an alternative method of producing the organopolysiloxanes according to the invention and containing sulphonate groups provides initially for a conversion of the suspension of the above defined polymeric di-, tri- and tetrasulfides, optionally cross-linked with the above mentioned oxidizing agents in the manner indicated for the first type of procedure.

In contrast to the first-described method, however, the oxidation process in this case is not interrupted by the separation of the solid from the liquid phase, but after achieving a certain stage of oxidation—ascertainable by pH monitoring—the suspension or solution is evaporated as quickly as possible at temperatures ranging from room temperature to 150° C., preferably in vacuo, and the remaining solid is dried, also optionally in vacuo, at temperatures ranging from room temperature to 200° C. and subsequently tempered over a period from 1 hour to 4 days, optionally in vacuo, at a minimum temperature of 150° C. to a maximum of 450° C. The tempered material is then extracted for several hours with water or with an aqueous acid solution and/or an alcohol containing from 1 to 5 C-atoms, preferably at an elevated temperature (e.g., use of hot to boiling water) in order to remove soluble components. Drying then follows, optionally in vacuo and, optionally, grinding and/or classification as well as retempering, whereby one or more of the steps following evaporation can be omitted or carried out in another sequence.

With regard to the stability of the ion-exchanger substances obtained in relation to the dissolution in water and in other protic media, it has proved to be advantageous in this modification of the method to add in certain cases to the oxidation suspension, shortly before the evaporation, tetramethyl or tetraethyl silicate or silica sol or water glass in a quantity from 10 to 300 weight percent of the initially used quantity of polymeric di-, tri-, and tetrasulfide that optionally may contain cross-linking agents of the type mentioned above. The $SiO_2$ units obtained also have the character of stabilizing cross-linking and bonding agents. However, when adding these cross-linking silicon compounds, the upper limit required in the introduction of a maximum of 10 cross-linking atoms versus the sum of Si-atoms from formulas (1) and (2) shall not be exceeded in this case either.

Following the three oxidation processes described above, the new strongly acidic cation exchangers are obtained in the $H^+$ form and/or already in substituted form. The latter is the case whenever the oxidizing agent is a salt or water glass is added as a bonding agent, with whose cation(s) an $H^+$-exchange can already take place.

According to another modification of the method, all other ion-exchange forms of the invention are obtainable which are not obtained directly during the process. This modification resides in converting the organopolysiloxanes carrying sulphonate groups and obtained according to the processes described above in undried, dried and/or tempered, ground, unground and/or classified form with an inorganic or organic reagent which can dissociate into a cation or an anion for the mutual exchange of the cations according to the static or dynamic ion-exchange principle, followed by washing and, optionally, separation of the solid from the liquid phase and, optionally, drying as well as grinding and/or classifying and tempering in any desired sequence.

This ion-exchange process also includes an ion-exchange in the form of a neutralization such as can be carried out in the case of previously known ion-exchange resins according to the static or dynamic principle.

Thus, the ion-exchange can be carried out in a stirred suspension of the initial polymeric sulphonate compound with the reagent which is at least partially dissolved and which is capable of disassociating. In this case, the insoluble material carrying sulphonate groups and featuring a basic organopolysiloxane structure is brought into contact with the reagent which is dissolved at least partially and with which the exchange is to be carried out in an aqueous suspension or in an organic suspension medium, preferably of a polar nature. The solid is then separated and, optionally, again agitated with a fresh solution of the reactant. This process is repeated until the ion exchange is completed quantitatively. Subsequently, the solid can be separated through conventional techniques such as filtering, centrifuging and/or decanting, washing free of salts and drying at room temperature or at a higher temperature up to 300° C., optionally in vacuo, and tempering at a temperature of 150° to 450° C., as well as grinding and classification.

If one proceeds according to the dynamic principle, then the initial compound containing sulphonte groups is utilized as an ion-exchange bed and it is brought into contact with the solution of the reactant which is partially dissolved. Here, too, secondary treatments can be provided to the extent mentioned earlier, as in the case of the products obtained according to the static method.

As a rule, the treatment steps following drying can also be reversed in sequence or some of them can be eliminated.

If a rectification column is used as an ion-exchange bed, then, in order to ensure an adequate flow, the initial polymeric product must have a certain minimum particle size which must also be determined according to the size of the column. Normally, in the case of laboratory columns one can manage with a minimum particle size of 0.2 mm. Here, too, following substitution one proceeds to salt-free washing and either secondary treatment steps or other substitution steps can be carried out. It is clear that substituted products can be ground not only in dry, but also in wet, condition.

The most important application of these new products is based on the ability of the polymeric organopolysiloxanes carrying sulphonate groups to exchange ions, that is to say, their application as a cation exchanger that can be used for all purposes and has the advantages of the matrix which is highly resistant to temperatures and solvents, of the strongly fixed sulphonate groups which resist dissolution, of the resistance to swelling in aqueous and organic mediums, and their applicability in organic media also.

Therefore, another object of the invention is the use of the organopolysiloxanes that carry sulphonate groups as cation exchangers.

The new cation exchangers described herein can also be characterized with the aid of elementary analyses and with reference to the substitution results. Their decomposition point in air goes well beyond 200° C. and exceeds 400° C. under protective gas atmosphere.

Depending on the preliminary treatment, they have surfaces from 0.1 to 2,000 m²/g and particle size diameters of about 1 cm to less than 1 μm. A particle size range from 0.1 to 1.5 mm, such as required for a technical application as an ion-exchanger, can be obtained without difficulty. The cation exchangers according to the invention have capacities ranging from about 0.1 to 5 meq H+/g organopolysiloxane. Preferably, their capacities range from approximately 0.5 to 3.5 meq H+/g oganopolysiloxane.

The invention will now be described in detail with reference to practical examples of the individual manufacturing variants according to the invention, taking into account the starting materials that are fundamentally the most significant.

EXAMPLE 1

8 g of an organopolysiloxane, consisting of units of the empirical formula $S_2[CH_2CH_2CH_2SiO_{3/2}]_2$, ground for 2 hours on a ball mill were suspended in 50 ml desalinated water. The suspension was treated with 154 g of a 35% aqueous hydrogen peroxide solution, which corresponds to 10 times the theoretically required quantity, and stirred for 7 hours at room temperature. The solid was then filtered off, washed with a total of about 1 liter water, dried at 120° C./80 mbar for 8 hours, tempered at 200° C. for 24 hours, then ground on a hammer mill. 8.9 g of a light-brown product (80.2% of the quantity to be expected with 100% oxidation) could be obtained which, according titration with 0.1 n NaOH solution, had an H+-capacity of 2.8 meq/g.

The starting material had the following analytical data:

| % C | % H | % S | % Si |
|---|---|---|---|
| 27.81 | 4.89 | 24.88 | 21.47 |

With complete oxidation of all disulfide groups into $SO_3H$ groups, the following analytical data would have been expected:

| 20.56 | 4.03 | 18.30 | 16.03 |
|---|---|---|---|

The following was found:

| 23.41 | 4.51 | 20.19 | 19.88 |
|---|---|---|---|

In this example and in the following examples, the degree of oxidation of the starting material was kept intentionally below the theoretically possible maximum value in a suitable test so as to reach a feasible compromise between the H+ capacity and the required insolubility of the polysiloxane matrix.

EXAMPLE 2

40 g of a finely ground, polymeric, asymmetrical disulfide consisting of units of the empirical formula $S_2[(CH_2)_3SiO_{3/2}][(CH_2)_5SiO_{3/2}]$ were suspended in 100 ml ethanol. The suspension was then treated with 250 ml of a 30% aqueous $H_2O_2$ solution and stirred for 6 hours at room temperature. This was followed by a dilution with 500 ml desalinated water and the solid was centrifuged off, washed out 3 times, each time with 200 ml $H_2O$, and subsequently dried for 12 hours at 150° C. 45.6 g of a brown product (84.5% of the quantity to be expected with full conversion of all disulfide groups into $SO_3H$ groups) were obtained. The H+ capacity achieved was 2.99 meq/g according to titration with 0.1 n caustic soda solution.

| Analytical data | % C | % H | % S | % Si |
|---|---|---|---|---|
| Starting Material | 33.89 | 5.85 | 22.07 | 19.46 |
| Theory with full oxidation into $SO_3H$ groups | 25.39 | 4.79 | 16.94 | 14.84 |
| Found | 28.18 | 5.01 | 17.93 | 16.02 |

EXAMPLE 3

30 g of an $SiO_{4/2}$ cross-linked organopolysiloxane containing disulfide groups, having a particle size of 0.05 to 0.6 mm and consisting of units of the empirical formula $S_2[(CH_2)_{12}SiO_{3/2}]_2 \cdot SiO_2$ were suspended in 100 ml desalinated water. The suspension was cooled down in a cooling bath to +5° C., then treated with 40.4 g (i.e., with 80% of the quantity required for full oxidation of the disulfide into $SO_3H$ groups) of a 40% aqueous peracetic acid and stirred for 1 hour at this temperature. 100 ml $H_2O$ were then added, the solid was filtered off by means of a vacuum suction, washed with a total of 500 ml $H_2O$, then dried for 6 hours at 120° C., tempered for 48 hours at 250° C., then extracted for 6 hours on a Soxhlet apparatus with water and dried again at 120° C./mbar for 6 hours. 30.7 g (87.2% of the quantity to be expected with full conversion of the disulfide groups into $SO_3H$ groups) could be obtained. According to titration with 0.1 n caustic soda solution the solid had an H+ capacity of 1.41 meq/g. This was followed by a classification into the particle sizes 0.2–0.6 mm, 0.05–0.2 mm and less than 0.05 mm using a suitable screen and grinding of the coarse portion.

| Analytical data | % C | % H | % S | % Si |
|---|---|---|---|---|
| Starting Material | 50.84 | 8.71 | 11.10 | 14.65 |
| Theory with full oxidation into $SO_3H$ groups | 43.48 | 7.60 | 9.67 | 12.71 |
| Found | 45.28 | 8.24 | 9.89 | 13.07 |

EXAMPLE 4

10 g of a polymeric cross-linked uncommunited disulfide consisting of units of the formula:

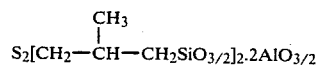

$$S_2[CH_2\!-\!\overset{\overset{\displaystyle CH_3}{|}}{CH}\!-\!CH_2SiO_{3/2}]_2 \cdot 2AlO_{3/2}$$

were suspended in 800 ml $Br_2$ water, with a total content of 20.9 g bromine. The suspension was stirred magnetically for 1 hour at 50° C., the solid was then siphoned off, washed with a total of 300 ml $H_2O$ and dried for 6 hours at 120° C./800 mbar. 9.8 g of the product (78% of the quantity required for full conversion of all $S_2$ groups into $SO_3H$) could be obtained. According to filtration of the material containing sulphonate groups and occurring in the form of H+ with 0.1 n caustic soda solution this had a capacity of 0.91 meq/g.

The starting materials had the following analytical data:

| % C | % H | % S | % Si | % Al |
|---|---|---|---|---|
| 25.83 | 4.76 | 16.21 | 14.13 | 13.44 |

With full oxidation of all disulfide groups into SO3H— groups the following analytical data would have been expected:

| | | | | |
|---|---|---|---|---|
| 20.00 | 3.78 | 13.35 | 11.69 | 11.23 |
| Found 22.16 | 4.08 | 14.76 | 12.71 | 12.09 |

EXAMPLE 5

50 g of an organopolysiloxane consisting of units of the empirical formula:

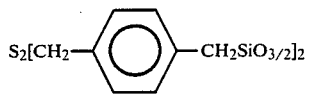

were suspended in 200 ml desalinated water. The suspension was then treated with 60 g sodium chlorite, heated to reflux temperature and stirred for 3 hours so as to distill to reflux. This was followed by cooling, addition of 300 ml 5 n sulphuric acid, stirring another hour at room temperature, centrifuging off the solid, washing 2 times: first with 100 ml 5 n H2SO4, the second time to remove the acid. After drying for 6 hours at 150° C./100 mbar and 24-hour tempering at 200° C./100 mbar, 52.7 g (83.6% of the quantity to be expected with full oxidation) of the product could be obtained which, according to titration with 0.1 n caustic soda solution, had a capacity of 1.78 meq/g.

The initial material had the following analytical data:

| % C | % H | % S | % Si |
|---|---|---|---|
| 50.69 | 4.76 | 17.21 | 14.23 |

With full oxidation, the following data would have been expected:

| | | | |
|---|---|---|---|
| 40.49 | 3.82 | 13.51 | 11.84 |
| Found 43.02 | 4.09 | 14.10 | 12.82 |

EXAMPLE 6

400 ml of a freshly prepared aqueous solution of peroxodisulphuric acid with a content of 44 g H2S2O8 was treated at 5° C. with 25 g of a polymeric disulfide consisting of units of the empirical formula:

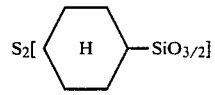

The suspension was stirred for 6 hours at this temperature, then diluted with 200 ml H2O, the remaining solid was centrifuged off, washed with a total of 500 ml H2O to remove the acid and dried for 10 hours at 150° C./100 mbar. According to titration of the organopolysiloxane (25.6) containing sulphonate groups occurring in the form of H+, the capacity was 2.30 meq/g.

The starting material had the following analytical data:

| % C | % H | % S | % Si |
|---|---|---|---|
| 42.81 | 6.18 | 19.08 | 16.21 |

Will full oxidation the following data would have been expected:

| | | | |
|---|---|---|---|
| 33.47 | 5.15 | 14.89 | 13.05 |
| Found 35.89 | 5.48 | 16.01 | 14.32 |

EXAMPLE 7

50 g of an organopolysiloxane consisting of units of the empirical formula:

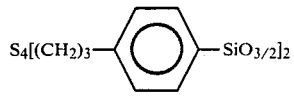

were combined with 750 g of a 25% H2O2 solution. The suspension was heated to 30° C. and stirred at this temperature with constant monitoring of the pH value. When after 4 hours the pH value was reduced from 5.5 to 2.0, a sample (about 2 g) was taken from the stirred solid which was washed with water, then processed further as the residual product. The remaining solid was stirred further for 2 hours until the pH value was fixed at 1.2. This was followed by filtering and washing of the solid with a total of 1 liter water to remove the acid, then drying for 5 hours at 150° C./100 mbar and tempering for 48 hours at 230° C./100 mbar, then washing out again with water and drying under the aforementioned conditions. Including the sample, 50.2 g of the product could be obtained, which corresponds to 93.6% of the quantity to be expected with full oxidation. According to titration with 0.1 NaOH, the following H+ capacities were obtained:

| Sample | | 1.50 meq H+/g | | |
|---|---|---|---|---|
| Principal quantity | | 2.40 meq H+/g | | |
| Analytical data* | % C | % H | % S | % Si |
| Theory with full oxidation | 43.01 | 4.41 | 12.76 | 11.18 |
| Found | 43.81 | 3.92 | 14.38 | 11.62 |

*Total quantity

EXAMPLE 8

Analogously to Example 7, upon completion of oxidation after 3 hours and achieving a pH value of 1.8, 49.4 g of the desired product with an H+ capacity of 2.1 meq/g were obtained from 50 g of an organopolysiloxane consisting of units of the formula S3[(CH2)3SiO3/2]2.0.1(H5C2)TiO3/2 and 500 g of a 25% aqueous/methanolic (1:1) H2O2 solution to which 10 g perbenzoic acid had been added.

| Analytical data* | % C | % H | % S | % Si | % Ti |
|---|---|---|---|---|---|
| Theory with full oxidation | 20.65 | 4.05 | 17.78 | 15.58 | 1.33 |
| Found | 22.04 | 4.35 | 19.24 | 16.70 | 1.41 |

*Total quantity

EXAMPLE 9

100 g of an organopolysiloxane containing disulfide groups and consisting of units of the empirical formula $S_2[(CH_2)_3SiO_{3/2}]_2$ with a particle size of 0.4–0.6 mm were placed in a 1-liter glass flask. The flask was positioned on a rotary evaporator and a vacuum of about 100 mbar was applied. By means of a Teflon tube extending into the rotating flask a total of 155 g of a 35% $H_2O_2$ solution were sprayed onto the organopolysiloxane within a hour. Then, by use of an oil bath the temperature of the rotating flask was increased to 120° C. within 3 hours and was left at this temperature for another 3 hours. The dark-brown material was tempered in a vacuum drying oven for 24 hours at 280° C./100 mbar, then extracted on a Soxhlet with water for 6 hours and, finally, dried again for 4 hours at 150° C./100 mbar 98.8 g of the product (71.2% of the quantity to be expected with full oxidation of all disulfide units) with an $H^+$ capacity of 1.76 meq/g could be obtained.

| Analytical data | % C | % H | % S | % Si |
|---|---|---|---|---|
| Theory with full oxidation | 20.56 | 4.03 | 18.30 | 16.03 |
| Found | 24.98 | 4.95 | 20.04 | 19.87 |

EXAMPLE 10

Analogously to Example 9, 50 g of an organopolysiloxane containing disulfide groups and consisting of units of the empirical formula $S_2[(CH_2)_3SiO_{3/2}]_2$ were sprayed with 180 g of a 40% alcoholic solution of peracetic acid at 80° C./100 mbar for two hours while simultaneously distilling off the evaporating alcohol. Subsequently, the temperature was raised to 120° C. at standard pressure, then the solid was washed out with a total of 1 liter $H_2O$, dried for 6 hours at 150° C./100 mbar and tempered for 48 hours at 250° C./100 mbar, then extracted on a Soxhlet for 5 hours and dried again for 5 hours at 150° C./100 mbar. 50.6 g of the product was obtained which, according to titration with 0.1 n caustic soda solution, had an $H^+$ of 1.95 meq/g.

| Analytical data | % C | % H | % S | % Si |
|---|---|---|---|---|
| Theory with full oxidation | 20.56 | 4.03 | 18.30 | 16.03 |
| Found | 23.76 | 4.83 | 20.85 | 18.24 |

EXAMPLE 11

200 g of an organopolysiloxane consisting of units of the empirical formula $S_2[CH_2CH_2CH_2SiO_{3/2}]_2$ were stirred into one liter of an approximately 30% sodium hypochlorite solution. The mixture was then heated for one hour to reflux temperature and stirred for a half hour at this temperature. The solution which by now became clear was then concentrated by evaporation by applying a slight vacuum. The solid residue was transferred to a vacuum drying oven, dried initially for 6 hours at 150° C., then tempered for 24 hours at 300° C. After extraction with water for 6 hours and drying again for 5 hours at 150° C./100 mbar, 237.6 g (76.0% of the quantity to be expected with full oxidation) of the product occurring in the form of $Na^+$ was obtained.

The product was then charged by means of a hammer mill, coarse-comminuted and then classified in the particle sizes 0.4 to 0.6 mm, 0.2 to 0.4 mm, 0.05 to 0.2 mm and <0.05 mm.

| Analytical data | % C | % H | % S | % Si | % Na |
|---|---|---|---|---|---|
| Theory with full oxidation | 18.27 | 3.07 | 16.26 | 14.24 | 11.66 |
| Found | 19.45 | 3.81 | 18.21 | 15.06 | 4.42 |

Accordingly, the product had an $Na^+$ capacity of 1.92 meq/g.

EXAMPLE 12

100 g of an organopolysiloxane consisting of units of the empirical formula:

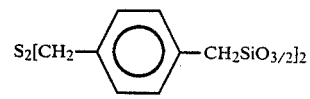

were suspended in 1 liter 10% hydrogen peroxide solution. The suspension was then heated to 60° C. and stirred for 1 hour at this temperature, during which process a clear solution arose from the suspension. After adding 55.3 g tetraethyl silicate the solution was then evaporated at the same temperature by applying a vacuum and the remaining residue was processed further analogously to Example 11. 111.3 g (78.5% of the quantity of the product to be expected with full oxidation) could be obtained with an $H^+$ capacity of 1.51 meq/g.

| Analytical data | % C | % H | % S | % Si |
|---|---|---|---|---|
| Theory with full oxidation | 35.94 | 3.39 | 11.99 | 15.76 |
| Found | 39.72 | 4.23 | 13.22 | 15.12 |

EXAMPLE 13

200 g of an organopolysiloxane consisting of units of the empirical formula $S_2[CH_2CH_2CH_2SiO_{3/2}]_2$ were suspended in 2 liters of a water/ethanol mixture (1:1) with a content of 215 g perpropionic acid in all. After stirring for 8 hours, after a clear solution had arisen, 240 g of a 40% silica sol ("Ludox 40") were added and the mixture of solvents and some of the acid were distilled off in the bottom of the column at 20 mbar and up to a temperature of 150° C. The remaining solid was washed out several times with cold ethanol, dried for 12 hours at 150° C. and tempered for 48 hours at 300° C./100 mbar, then extracted on a Soxhlet for 5 hours with 1 n HCl solution and dried again for 6 hours at 150° C. 260.5 g (69.9% of the quantity to be expected with full oxdation) with an $H^+$ capacity of 1.90 meq/l could be obtained.

| Analytical data | % C | % H | % S | % Si |
|---|---|---|---|---|
| Theory with full | 15.31 | 3.00 | 13.62 | 23.87 |

| Analytical data | % C | % H | % S | % Si |
|---|---|---|---|---|
| -continued | | | | |
| oxidation | | | | |
| Found | 18.22 | 3.67 | 14.99 | 23.15 |

EXAMPLE 14

An analogous experiment as in Example 12, with the difference that instead of tetraethylsilicate, 162 g of a 20% water glass solution were added prior to evaporation and the tempered solid was stirred prior to extraction 3×1 hour in 300 ml 2 n HCl solution, produced 114.2 g of the product with an H+ capacity of 1.63 meq/g.

| Analytical data | % C | % H | % S | % Si |
|---|---|---|---|---|
| Theory with full oxidation | 35.94 | 3.39 | 11.99 | 15.76 |
| Found | 39.22 | 4.17 | 13.04 | 17.26 |

EXAMPLE 15

1 g of the organopolysiloxane prepared according to Example 1 and containing sulphonate groups and with H+ as the ion of opposite charge and a capacity of 2.8 meq/g was stirred for a half hour in 40 ml 0.1 n methanolic NaOH solution. Then, the solid was filtered off from the remaining solution and washed free of alkali with a total of 100 ml ethanol. The wet material was then transferred to 20 ml 0.5 n HCl solution, stirred for 15 minutes and centrifuged off. After repeating this last step twice, the solid was washed free of acid with a total of 100 ml methanol and dried for 5 hours at 120° C./100 mbar. The remaining acid solutions and washing methanol were mixed and the Na content was determined. According to this analysis, 58.6 mg Na+ had been set free during the treatment with HCl, i.e., approximately 91% of the theoretical capacity. Accordingly, renewed titration of the dried solid with 0.1 n NaOH again product an H+ capacity of approximately 2.7 meq/g.

EXAMPLE 16

1 g of the cross-linked organopolysiloxane produced according to Example 3 and containing sulphonate groups with a particle size of 0.05 to 0.2 mm and an H+ capacity of 1.41 meq/g was stirred for a half hour in 20 ml 0.1 n NaOH. This was followed by filtering and washing out of the solid with a total of 60 ml H$_2$O. According to back titration of the filtrate combined with the washing liquid with 0.1 n HCl, approximately 100% of the ion exchanger was now present in Na+ form. The undried solution was then suspended in 20 ml 0.1 n CuSO$_4$ solution and stirred also for a half hour, then filtered off and again suspended in a 20-ml 0.1 n CuSO$_4$ solution and stirred. The filtered, washed, and dried solid (a total of 1.07 g) was then checked for its content of Cu$^{2+}$. According to this analysis, a total of 43 mg Cu$^{2+}$ was bonded, which corresponds to 1.35 meq. In the combined residual CuSO$_4$ solutions and washing solutions the total Na+ quantity as counter-probe was determined at 31.5 mg, which corresponds to 1.37 meq.

EXAMPLE 17

5 g of the organopolysiloxane containing sulphonate groups produced according to Example 5 with a particle size of 0.05 to 0.2 mm were stirred 3 times in a 50-ml 0.5 n CaCl$_2$ solution each time for a half hour, then filtered off and washed with a total of 150 ml H$_2$O. The combined HCl quantity set free as a result was determined at 323 mg (99.5% of the theoretical value). The ion exchanger now charged with Ca$^{2+}$ was thereupon stirred 3 times in a 50-ml 0.5 n FeCl$_3$ solution, each time for a half hour, then filtered off again at the end and washed with a total of 150 ml H$_2$O. In the combined filtrates and washing liquids all the quantity of Ca$^{2+}$ set free was determined at 171 mg, which corresponds to 95.8% of the quantity to be expected with 100% charging and setting free. The ion exchanger charged with Fe$^{3+}$ was subsequently stirred three times in a 50-ml 0.5 n HCl solution, each time for a half hour, then filtered off again at the end, and washed with a total of 150 ml H$_2$O. The quantity of Fe$^{3+}$ set free was determined to be 157 mg, which corresponds to approximately 95% of the quantity to be expected with 100% charge and release. A final determination of the H+ capacity of the dried material produced a value of 1.73 meq/g.

EXAMPLE 18

5 g of the organopolysiloxane containing sulphonate groups and present in the Na+ form prepared according to Example 11 and having a particle size of <0.05 and an Na+ capacity of 1.92 meq/g were stirred, analogously to Example 17, three times in a 50-ml 0.5 silver nitrate solution, each time for a half hour, then washed out with a total of 150 ml H$_2$O and the quantity of Na+ set free or the quantity of Ag+ still present was determined. Then, a total of 207 mg Na+ (94% of the total capacity) had gone into solution and 984 mg Ag+ (95% of the total capacity) had been bonded to the solid.

The exchanger material charged with Ag+ was subsequently, as described earlier, treated three times with a 30-ml 0.5 n MnSO$_4$ solution, then washed with a total of 150 ml H$_2$O and dried for 6 hours at 150° C./100 mbar. An analysis of the solid yielded a total Mn$^{2+}$ content of 240 mg (91% of the total capacity). In the combined residual solutions a total of 953 mg Ag+ (92% of the total capacity) was found.

EXAMPLE 19

20 g of the organopolysiloxane containing sulphonate groups and prepared according to Example 10 and having a particle size of 0.4 to 0.6 mm and an H+ capacity of 1.95 meq/g were deposited into a glass column with a fritted bottom and an inner diameter of 15 mm without an increase in volume due to swelling being observed. The column was then charged in 5 portions with a total of 200 ml 0.5 n zinc sulphate solution over a total period of 2 hours, followed by washing of the column with 0.5 liter H$_2$O. Titration of the acid set free produced a total quantity of 38 meq H+ (97.4% of the capacity found). The ion exchanger now present in the form of Zn$^{2+}$ was then charged with a 250-ml 0.5 n CoCl$_2$ solution, again in 5 portions over a total period of 2 hours, and the column was washed with 0.5 liter H$_2$O. A determination of the Zn$^{2+}$ content of the combined solutions produced a total quantity of 2259 mg (90% of the theoretical capacity).

EXAMPLE 20

20 g of the organopolysiloxane containing sulphonate groups prepared according to Example 11 and having a particle size of 0.2 to 0.4 mm, present in the form of Na+ and having an Na+ capacity of 1.92 meq/g, were deposited into a glass column with a fritted bottom and an inner diameter of 15 mm. The column was then charged with 100 ml of a solution with a total $Cd^2$ content of 112.4 mg in one hour and subsequently with 100 ml of a solution with a total $Hg^{2+}$ content of 200.6 mg in another hour and subsequently washed again with 300 ml $H_2O$. Neither $Cd^{2+}$ nor $Hg^{2+}$ could then be detected in the wash water. The set-free acid corresponded approximately to the bonded quantity of heavy metals.

Subsequently, the column was charged in 5 portions with a total of 200 ml 2 n HCl solution and washed again with 0.5 liter $H_2O$. $Cd^{2+}$ and $Hg^{2+}$ were determined in the wash water and 89.5% of the $Cd^{2+}$ and 91.3% of the utilized $Hg^{2+}$ could again be found.

We claim:

1. An organopolysiloxane containing the same or different units represented by the structural formula:

 (1)

wherein $R^1$ is a linear or branched alkyl having 1 to 12 C-atoms, cycloalkyl with 5 to 8 C-atoms or:

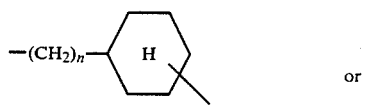 or

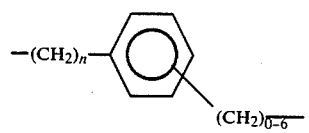

wherein n is an integer from 1 to 6 and indicates the number of sulphur attached methylene groups, x is dependent on M and is an integer from 1 to 4 and M represents hydrogen or a mono- to tetravalent metal ion and the free valences of the oxygen atoms are saturated by silicon atoms of other groups of the formula (1) and/or by cross-linking bridge members

| SiO$_{4/2}$ | or | R'SiO$_{3/2}$ | or | R$_2$'SiO$_{2/2}$ | or |
|---|---|---|---|---|---|
| TiO$_{4/2}$ | or | R'TiO$_{3/2}$ | or | R$_2$'TiO$_{2/2}$ | or |
| AlO$_{3/2}$ | or | R'AlO$_{2/2}$ | | | | wherein R' is methyl or ethyl,
and/or are saturated by di-, tri- and tetrasulfide units of the general formula:

 (2)

wherein $R^1$ has the same meaning as in formula (1) and may be the same or different, the ratio of the sum of the Si- atoms in formulas (1) and (2) to the bridge atoms silicon, titanium and aluminum ranging from 1:0 to 1:10.

2. The organopolysiloxane according to claim 1, wherein when $M^{x+}=H^+$, there is then at least 0.1 meq $H^+/g$ organopolysiloxane.

3. The organopolysiloxane according to claim 1, wherein all $R^1$ are identical.

4. The organopolysiloxane according to claim 3, wherein $R^1$ is propylene.

5. The organopolysiloxane according to claim 1, wherein $M^{x+}$ is $H^+$.

6. The organopolysiloxane according to claim 1, wherein the free valences of the oxygen in formula (1) are saturated by at least one other group of formula (1).

7. The organopolysiloxane according to claim 1, wherein the free valences of the oxygen in formula (1) are saturated by at least one cross-linking bridge members according to claim 1.

8. The organopolysiloxane according to claim 1, wherein the free valences of the oxygen in formula (1) are saturated by at least one bisulfide unit of the formula:

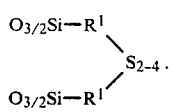

9. The organopolysiloxane according to claim 1, which has been tempered for 1 hour to 4 days at temperatures ranging from 150° C. to 450° C.

10. The organopolysiloxane according to claim 9, which has been tempered in vacuo.

11. An organopolysiloxane containing as the recurring monomeric unit the same or different unit of the formula:

 (1)

wherein $R^1$ is linear or branched alkyl having 1 to 12 C-atoms, cycloalkyl with 5 to 8 C-atoms or:

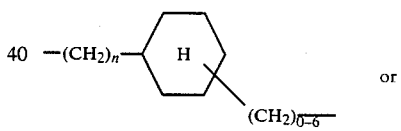

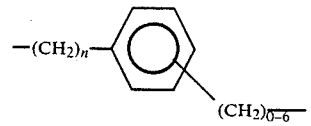

wherein n is an integer from 1 to 6 and indicates the number of recurring methylene groups attached to sulfur, x is dependent on the value of M and is an integer from 1 to 4 and M is hydrogen or a mono- to tetravalent metal ion, the free valences of the oxygen atoms being saturated by silicon atoms of at least one member of the group consisting of a unit of the formula (1) and cross-linking bridge members

| SiO$_{4/2}$, | | R'SiO$_{3/2}$, | R'$_2$SiO$_{2/2}$, |
|---|---|---|---|
| TiO$_{4/2}$, | | R'TiO$_{3/2}$, | R'$_2$TiO$_{2/2}$, |
| AlO$_{3/2}$ | or | R'AlO$_{2/2}$ | | wherein R' is at least one member of the group consisting of methyl, ethyl
or di-, tri- and tetrasulfide units of the formula:

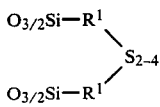

in which the bridge member $R^1$ has the same meaning as in formula (1) can the same or different,
the ratio of the sum of the Si- atoms in formulas (1) and (2) to the bridge atoms silicon, titanium and aluminum being 1:0 to 1:10.

12. An organopolysiloxane according to claim 11, wherein when $M^{x+}=H^+$ then there is at least 0.1 meq H+/g organopolysiloxane up to a maximum of 3.5 meq H+/g organopolysiloxane.

13. The organopolysiloxane according to claim 12, wherein $R^1$ are identical.

14. The organopolysiloxane according to claim 13, wherein $R^1$ is propylene.

15. The organopolysiloxane according to claim 14, wherein $M^{x+}$ is $H^+$.

16. A method for producing an organopolysiloxane having the formula according to claim 1, comprising converting
  in the presence of water and/or in an alcohol containing from 1 to 5 C-atoms,
  a polymeric di-, tri- or tetrasulfides consisting of units of the formula:

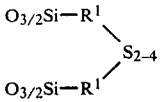

wherein $R^1$ is the same or different and is linear or branched alkyl containing 1 to 12 C-atoms, cycloalkyl having 5–8 C-atoms,

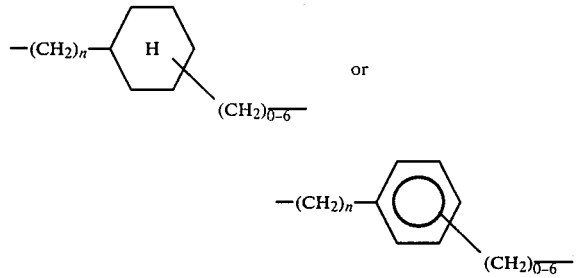

wherein n is an integer from 1 to 6 and indicates the number of methylene groups attached to sulfur groups,
the free valences of the oxygen atoms being saturated by silicon atoms of other groups of the formula (1) and/or by cross-linking bridge members of the formula:

| SiO4/2, | | R'SiO3/2, | R'2SiO2/2, |
|---|---|---|---|
| TiO4/2, | | R'TiO3/2, | R'2TiO2/2, |
| AlO3/2 | or | R'AlO2/2 | | with an oxidizing agent which is at least partially dissolved and whose oxidation potential is at least sufficient to convert C-bonded sulphur of the formal stage of oxidation-1 into C-bonded sulphur of the formula stage of oxidation +4
  at temperatures ranging from $-78°$ to $250°$ C., whereupon the solid is separated or extracted from the liquid phase.

17. The method for producing an organopolysiloxane according to claim 16, wherein a stochiometrically insufficient quantity of an oxidizing agent is used.

18. The method for producing an organopolysiloxane according to claim 16, wherein an excess up to 20 times of the quantity of an oxidizing agent required for all oxidation is used.

19. The method for producing an organopolysiloxane according to claim 16, wherein the temperature is $-30°$ to $150°$ C.

20. The method for producing an organopolysiloxane according to claim 16, wherein the temperature is $0°$ to $100°$ C. and at a maximum pH value of 11.

21. The method for producing an organopolysiloxane according to claim 16, wherein the converting takes place under a pressure which corresponds to the sum of the partial pressures of the reactants at the reaction temperature.

22. The method for producing an organopolysiloxane according to claim 16, wherein the solid is separated and washed, then dried, at temperatures ranging from room temperature to $200°$ C.

23. The method for producing an organopolysiloxane according to claim 22, wherein the drying takes place in vacuo.

24. The method for producing an organopolysiloxane according to claim 16, wherein the product is tempered from 1 hour to 4 days at temperatures ranging from $150°$ to $450°$ C.

25. The method for producing an organopolysiloxane according to claim 24, wherein the tempering is in vacuo.

26. The method for producing an organopolysiloxane according to claim 16, wherein the process includes extraction or washings and drying.

27. The method according to claim 16, wherein the polymeric di-, tri-, or tetrasulfides are in suspension in said water and/or alcohol.

28. The method according to claim 16, wherein the polymeric di-, tri-, or tetrasulfides are in solution in said water and/or alcohol.

29. The method of producing organopolysiloxane according to claim 16, wherein the polymeric di-, tri-, or tetrasulfides consisting in units with the formula:

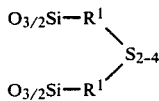

wherein the two groups $R^1$ have the same or different meaning and are a linear or branched alkyl containing from 1 to 12 C-atoms, cycloalkyl containing from 5 to 8 C-atoms,

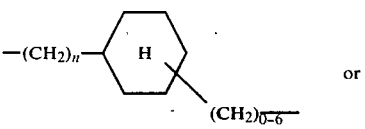

-continued

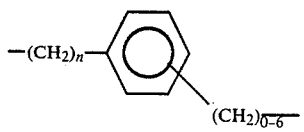

wherein n is an integer from 1 to 6 and indicates the number of the methylene group attached to sulphur the free valences of the oxygen atoms being saturated by silicon atoms of other groups with the formula (2) and/or by cross-linking bridge members of the formula:

| | | |
|---|---|---|
| $SiO_{4/2}$, | $R'SiO_{3/2}$, | $R'_2SiO_{2/2}$, |
| $TiO_{4/2}$, | $R'TiO_{3/2}$, | $R'_2TiO_{2/2}$, |
| $AlO_{3/2}$ or | $R'AlO_{2/2}$ | | wherein R' is a methyl or ethyl group
is suspended in water and/or in an alcohol containing from 1 to 5 C-atoms with
an oxidizing agent whose oxidation potential is at least sufficient to convert C-bonded sulphur of the formala stage of oxidation −1 into C-bonded sulphur of the formula stage of oxidation, at temperatures ranging from −78° to 250° C., to obtain a resulting suspension or solution
and evaporating said suspension or solution at temperatures ranging from room temperature to 150° C. to recover the product.

30. The method according to claim 29, wherein tetramethyl, tetraethyl silicate, silica sol or water glass is added prior to evaporating in a quantity ranging from 10 to 300 weight percent in relation to the quantity of the sulfide used.

31. The method according to claim 29, wherein evaporating is in vacuo.

32. The method according to claim 29, wherein the solid remaining after evaporating is dried at temperatures ranging from room temperature to 200° C., and tempered for 1 hour to 4 days, at temperatures ranging from 150° to 450° C.

33. The method according to claim 32, wherein the tempered product is extracted with water or with an aqueous acidic solution and/or with an alcohol with from 1 to 5 C-atoms, after which it is dried.

34. The method of claim 33, wherein the product is thereafter ground.

35. The method of claim 34, wherein the product is thereafter classified.

36. The method of claim 32, wherein heating is carried out in vacuo.

37. The method according to claim 16, wherein the oxidation of the di-, tri- or tetrasulfide groups is carried out with hydrogen peroxide, sodium peroxide, sodium persulphate, sodium chlorite, sodium hypochlorite, bormium or bromine water or inorganic or organic peracids or a mixture of hydrogen peroxide with acids or inorganic or organic peracids.

38. The method according to claim 17, wherein the oxidation of the di-, tri- or tetrasulfide groups is carried out with hydrogen peroxide, sodium peroxide, sodium persulphate, sodium chlorite, sodium hypochlorite, bromium or bromine water or inorganic or organic peracids or a mixture of hydrogen peroxide with acids or inorganic or organic peracids.

39. The method according to claim 18, wherein the oxidation of the di-, tri- or tetrasulfide groups is carried out with hydrogen peroxide, sodium peroxide, sodium persulphate, sodium chlorite, sodium hypochlorite, bromium or bromine water or inorganic or organic peracids or a mixture of hydrogen peroxide with acids or inorganic or organic peracids.

40. The method according to claim 16, wherein the resulting organopolysiloxane containing sulphonate groups is then washed with an inorganic or organic reagent, which can disassociate into a cation and an anion, for the mutual exchange of the cations according to the static or dynamic ion exchanger principle.

41. The method according to claim 40, wherein the solid product is then separated from the liquid phase.

42. The method according to claim 41, wherein the separated solid is dried.

43. The method according to claim 42, wherein the dried product is classified and tempered.

44. The method according to claim 40, wherein the ion exchange is carried out in a moved suspension of the initial compound with the reagent which is dissolved at least partially and is capable of disassociating.

45. The method according to claim 40, wherein the starting compound is brought into contact as an ion-exchange bed with the solution of the reagent which is dissolved at least partially.

* * * * *